May 25, 1948.  J. C. SHAW  2,442,180
OIL COOLER CONSTRUCTION
Filed Oct. 1, 1945  2 Sheets-Sheet 1
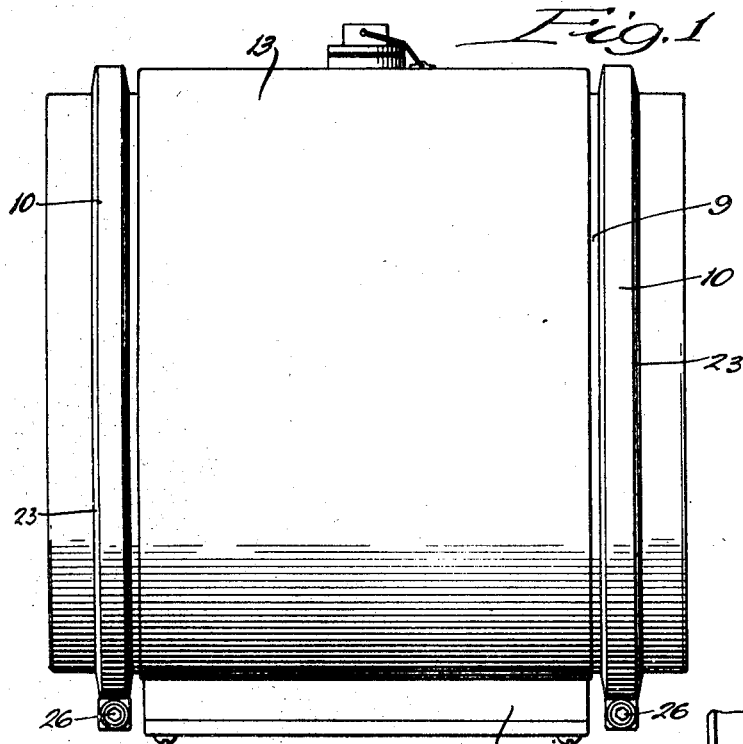
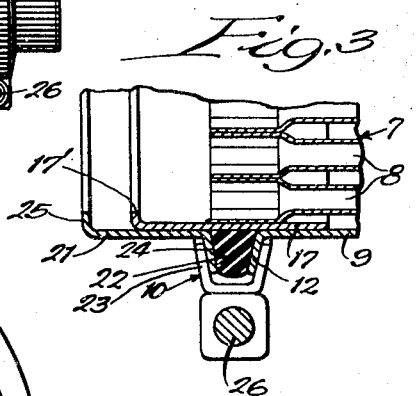
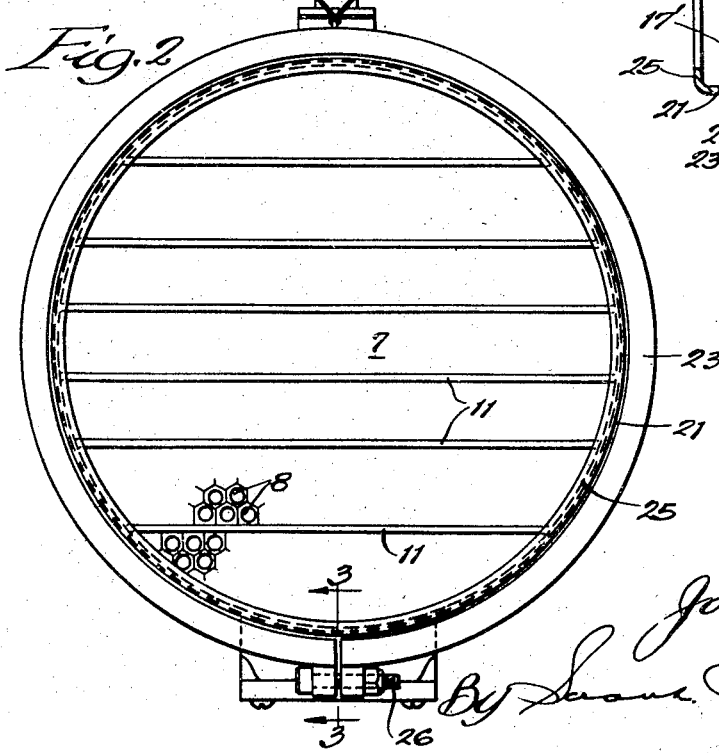
Inventor:
Joe C. Shaw, May 25, 1948.   J. C. SHAW   2,442,180
OIL COOLER CONSTRUCTION
Filed Oct. 1, 1945   2 Sheets-Sheet 2
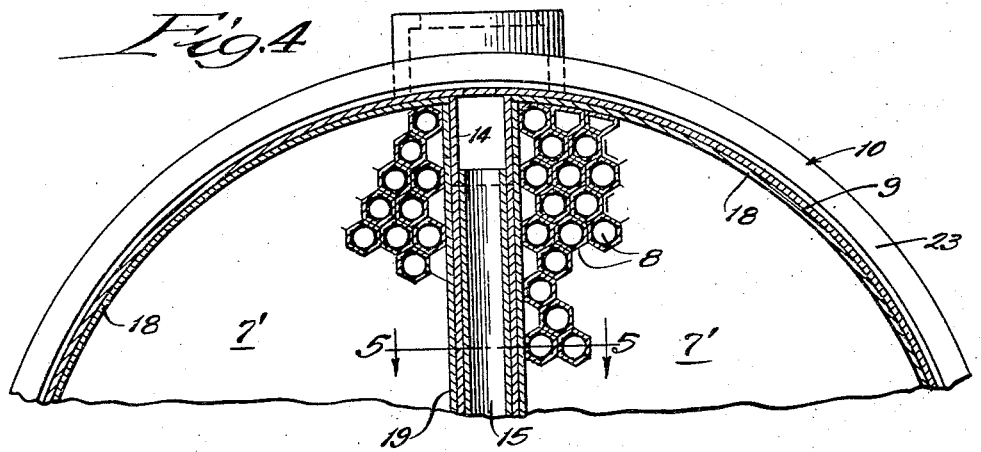
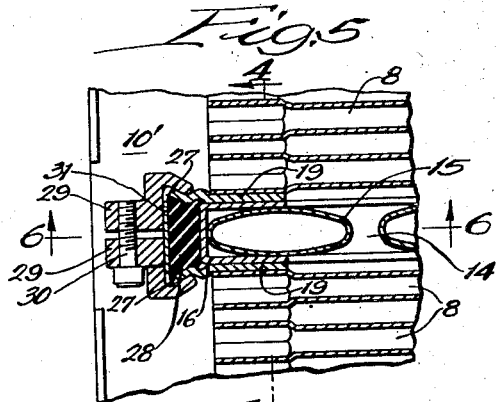
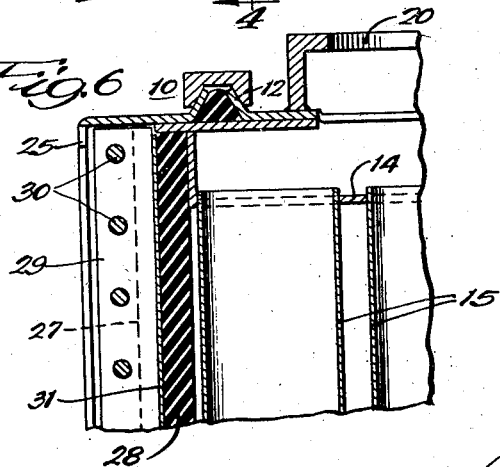
Inventor:
Joe C. Shaw, Patented May 25, 1948

2,442,180

UNITED STATES PATENT OFFICE 2,442,180

OIL COOLER CONSTRUCTION

Joe C. Shaw, Racine, Wis., assignor to Young Radiator Company, Racine, Wis., a corporation of Wisconsin Application October 1, 1945, Serial No. 619,667

2 Claims. (Cl. 257—128)

This invention relates to heat exchange devices of the type wherein a battery of parallel tubes are arranged in radially-spaced relationship with their ends bonded together to form a core unit which, when sealed within a housing or shell, provides a labyrinth within said housing around said tubes for the flow of a coolant, the temperature of which is to be regulated by the temperature of a cooling medium passing through the tubes. Devices of this type are extensively used for conditioning the temperature of lubricating oil required for power-producing units, particularly those employed for aircraft.

The core unit may be made up in either of two ways.

Generally the tubes for such heat exchange core units are circular in cross section throughout their length except for the end portions which are hexagonally expanded. When these tubes are assembled, the hexagonal heads hold the circular sections in spaced relationship and thus form the desired labyrinth around the tubes. The labyrinth is closed at its ends by bonding together the interfitting hexagonal tube ends and sealing the juncture of the perimetrical row of tube ends of the core unit with the housing. The bonding of the tube ends is effected by soldering, brazing, or welding, as circumstances may require.

An alternative practice is to mount tubes of circular cross section throughout their length in header plates, the holes in the header plates which support the tubes being spaced apart so as to provide for the desired radial spacing between the tubes.

Heretofore the sealing of the perimetrical juncture of the core unit and the housing has always been effected by soldering, brazing, or welding. In such constructions, however, it has been impossible to remove the core unit for inspection, cleansing, or repair without seriously mutilating either the core unit or the housing or both. Thus, the repair of any serious failures in these prior structures has been impractical. Complete replacement of one heat exchange device with another has been the only alternative.

One instance where the only alternative has been the replacement rather than repair of a cooler occurs when, due to lack of proper lubrication, engine bearings disintegrate and particles of metal become deposited in the lubricating oil stream. These metal particles naturally accumulate in the core labyrinth. An oil cooler once exposed to such a condition would have to be abandoned in order to avoid the hazard of having these metal particles delivered with an oil stream to reach engine bearings, as would be likely to be the case if the cooler were again used.

The main objects of this invention, therefore, are to provide, an improved heat exchange device of the type described wherein the tubes are formed into the core unit separately of the housing and the unit is removable from the housing as occasion may demand; to provide improved means for effecting a fluid-tight seal at the perimetrical juncture of the core unit and housing; and to provide such a sealing means for use in connection with heat exchange devices having either an external or internal warm-up chamber.

Two embodiments of this invention are shown in the accompanying drawings wherein Fig. 1 is a side view of a heat exchange device for the external warm-up chamber type constructed in accordance with this invention;

Fig. 2 is an end view of the same;

Fig. 3 is an enlarged fragmentary sectional view taken on the line 3—3 of Fig. 2;

Fig. 4 is an enlarged fragmentary cross-sectional view of a heat exchange device of the internal warm-up chamber type constructed in accordance with this invention, the plane of the view being on the line 4—4 of Fig. 5;

Fig. 5 is an enlarged fragmentary sectional view taken on the line 5—5 of Fig. 4; and Fig. 6 is an enlarged fragmentary sectional view taken on the line 6—6 of Fig. 5.

A heat exchange unit constructed in accordance with this invention may be of either the external warm-up chamber type or the internal warm-up chamber type. In either case the invention comprises a core unit 7 formed of a plurality of parallel tubes 8 and adapted to be enclosed in a housing or shell 9, with the juncture of core and shell made fluid-tight by a sealing means 10.

The form of the core unit 7 is of necessity dependent upon the type of heat exchange unit—whether the housing is formed with an external warm-up chamber or with an internal warm-up chamber. For the former, the tubes 8 are assembled in the form of a cylinder as shown in Fig. 2. For the latter, the tubes 8 are assembled to form two complementary semi-cylindrical sections 7' as shown in Fig. 4. In either case the core unit is equipped with perimetrical end bands which telescopically fit with and support the unit within the housing 9, as will more fully hereinafter appear.

The tubes 8 used for making the core unit 7 herein shown are of a conventional design. They are cylindrical in cross-section throughout their length except at the ends, where they are expanded and formed hexagonal. These hexagonal ends space the tubes radially so that when the ends of the tubes are bonded together and the core unit 7 is sealed in the housing 9 a labyrinth is formed within the housing around the tubes. This labyrinth provides for the flow of a coolant, the temperature of which is to be regulated by the temperature of a cooling medium flowing axially through the tubes 8. The bonding of the hexagonal heads of the tubes 8 may be either by the process of soldering, brazing, or welding.

In the formation of these core units it is a general practice to place baffle sheets 11 between groups of the tubes 8 so as to force a circuitous flow of the coolant through the labyrinth.

The housing or shell 9 is of the usual cylindrical form except that at its ends there are formed outwardly-disposed flanges 12. Such a housing may be provided with an external warm-up chamber as shown in Figs. 1 and 2, or it may be provided with an internal warm-up chamber as shown in Figs. 4, 5, and 6. The external warm-up chamber is formed by bonding a channel-shaped element 13, of less width than the housing 9, on the outer periphery thereof. The internal warm-up chamber may be formed in various ways. The construction herein shown closely follows the disclosure of the co-pending application of Shaw et al., Serial No. 508,104, filed October 29, 1943. This involves the use of headers 14 secured on the inner faces of the housing 9 at diametrically-opposed points, which headers are connected together by means of diametrically-disposed tubes 15. The axial ends of the internal warm-up chamber are closed by U-shaped members 16 which extend the full distance between and are bonded at their ends to the ends of the headers 14.

A valve base 20 of the desired type is mounted on the housing 9. On this may be mounted thermostatically-actuated valve means for controlling the flow of coolant through the labyrinth of the core and/or through the warm-up chamber.

The form of the perimetrical end bands, whereby the core units 7 are supported in the housing 9, obviously depends somewhat upon the character of the core unit—whether it is constructed for use with a housing having an external warm-up chamber or an internal warm-up chamber.

For the cylindrical core unit 7, employed with the housing 9 with the external warm-up chamber, the perimetrical band is in the form of an annular member 17 which extends entirely around and is bonded to the heads of the peripheral tubes 8. For the semi-cylindrical core units 7' the perimetrical band for each section comprises an arcuate member 18 and a diametrically-disposed plate 19. The arcuate member 18 extends around and is bonded to the heads of the peripheral row of tubes of the semi-cylindrical section 7', whereas the plate 19 is bonded to the heads of the diametrical row of tubes 8 of each of the semi-cylindrical core sections 7'.

The band 17 and the arcuate members 18, which constitute the equivalent of the band 17, are of an outside diameter practically equal to the inside diameter of the housing 9. Thus these parts have telescopic engagement with the housing 9 and serve to support the core unit 7 or the core unit section 7' within the housing 9. The plates 19 for the core unit sections 7' fit closely against the members 16. The members 17 and 18 and the plates 19 are of a length that permits them to extend beyond the ends of the housing 9 when the core unit 7 is properly in place within the housing 9. Also the outer ends of these members are formed with flanges 17' which serve to strengthen said members.

The juncture of these various parts requires means for forming a fluid-tight sealing thereof in order to avoid any leakage of the coolant flowing through the labyrinth of the core. This sealing must be effected so as to withstand the pressures to which the core unit is subjected, without allowing the slightest amount of leakage through any of said junctures.

The sealing means 10, whereby the fluid-tight seal is secured at these junctures of the core unit 7 or the core unit sections 7' and the housing 9, comprises an annulus 21, a packing element 22, and a clamping ring 23.

The annulus 21 is of the same diameter as the housing 9 and constitutes a sort of extension thereof. A flange 24 is formed on its inner edge complementary of the flange 12 formed on the housing 9. It also has an inwardly-disposed flange 25 formed along its outer edge complementary of the flange 17' on the band 17.

The packing element 22 may be of rubber or comparable material and is in the form of a ring fitting around the band 17 between the complementary flanges 12 and 24.

The clamping ring 23 has either a V- or U-shaped recess formed on its inner face so as to embrace the flanges 12 and 24. A bolt and nut 26 connects the ends of the ring 23 whereby it is adapted to be contracted so as to draw the flanges 12 and 24 together and consequently force the packing element 22 to establish a fluid-tight seal at the juncture of the telescoping band 17 and the housing 9.

For a heat exchange device of the internal warm-up chamber type, an auxiliary clamping means 10' is required to secure a fluid-tight seal at the juncture of the plates 19 and the members 16. To that end the members 19 are extended to form a pair of complementary flanges 27 between which is located a packing strip 28 similar to the packing element 23. A pair of complementary clamping bars 29 embrace the flanges 27 and may be drawn together by means of the bolts 30 so as to force the flanges 27 against the packing strip to seal the juncture between the member 16 and the plates 19. A plate 31 is inserted between the clamping bars 29 and the packing strip 28 so as to keep the strip from being forced out through the gap between the clamping bars 29.

In an oil cooler constructed in accordance with this invention, it is possible to remove the core unit 7, or the separate units 7' whenever there appears to be some fault in the functioning of the oil cooler. Such removal makes possible the inspection of the tubes, the flushing of the labyrinth, and possibly an occasional replacing of a tube. Thereupon the core unit 7 or the separate sections 7' could be replaced in the housing 9 and after applying and drawing up the clamping means 10 and 10' the device again would be ready for operation. As occasion may require it would also be possible to equip a core unit with a new housing or shell where a former one had become defective.

After the several parts of such an oil cooler construction are formed, including either the single core unit 7 or the twin unit 7', the core unit is inserted into the shell 9 and positioned so that the bands 17 extend beyond the flanges 12 of the shell. Thereupon packing element 22 is slipped over each of the bands 17 and pushed up against the shell flanges 12. Then each of the annuli 21 is pushed onto the bands 17 with the flange 24 pressing the packing element 22 against the shell flange 12. The ring 23, with the bolt and nut 26 removed, is sprung apart to permit the flanges 12 and 24 to be received in the channel of said ring. Thereupon the bolt and nut 26 may be replaced and the nut screwed up to an extent that will contract the ring 23 sufficiently to force the flanges 12 and 24 to press the sealing element 22 into the juncture formed between the abutting interior and exterior peripheries of the shell 9 and the bands 17 respectively.

In connection with the modification shown in Figs. 4, 5, and 6, the packing element 28 is inserted between the flanges 27 on the strips 19 after which the plate 31 is placed against the packing strip 28 and the bars 29 and 30 are arranged in the position shown in Fig. 4, and the bolts 30 turned to draw these bars toward each other for the purpose of causing the flanges 27 to compress the packing strip 28 into the juncture between the abutting faces of the members 16 and the plates 19.

Obviously, when it is desired to remove the core unit the parts are dismantled in the reverse order.

Other variations and modifications of the details of structure and arrangement of the parts herein shown and described may be resorted to within the spirit and coverage of the appended claims.

I claim:
1. An oil cooler device of the class described comprising, an open-ended cylindrical shaped sheet metal housing having the peripheral portions thereof bent outwardly to form transversely-disposed flanges, a plurality of tubes bonded at their ends to form a core unit mountable within said housing, sheet metal bands bonded to the perimeters of said core unit at each end thereof and adapted to telescopically fit within the respective ends of said housing, a pair of sheet metal annuli of a diameter equal to said housing and each having the inner peripheral portions thereof bent outwardly to form transversely-disposed flanges, said annuli being adapted to telescopically fit over the respective bands to bring the flanges on said annuli in opposed relationship to said shell flanges, a packing element insertable between each pair of said opposed flanges and the respective band, a sheet metal clamping ring of U-shaped cross-section telescopically embracing said opposed flanges on each of said annuli and housing, and means for contracting said clamping ring so as to compress said packing element to effect a fluid-tight seal at the perimetrical junctures of said bands and housing.

2. A heat exchange device of the class described comprising, an open-ended cylindrical housing having a transversely-disposed peripheral flange formed at each end thereof, partition means extending diametrically across said housing to form an internal axially-disposed chamber, a plurality of tubes bonded together at their ends to form a pair of semi-cylindrical core units mountable within said housing on opposite sides of said partition, a semi-circular band and a diametrically-disposed plate bonded respectively to the circumferential and diametrical peripheries at each end of each of said semi-cylindrical core units and adapted to have telescoping engagement with the inner periphery of said housing and the inner face of said partition at the opposite ends of said housing, a pair of annuli of a diameter equal to said housing and each having a transverse peripheral flange formed on one edge thereof, said annuli being adapted for telescoping engagement with the outer periphery of the semi-circular bands of said core units when said core units are assembled in said housing to bring the flanges on said annuli into opposed relationship with the flanges on said housing, a flange on each of said diametrical plates extending axially beyond the ends of said housing partition, a packing element mounted between the pairs of opposed flanges on said housing and annuli, a packing strip interposed between said plate flanges, a clamping ring formed to embrace said opposed flanges on each of said annuli and housing, means adapted to contract each of said rings to force said flanges to compress said packing element to effect a fluid-tight seal at the perimetrical juncture of said core units and said housing, a pair of opposed clamping bars embracing each pair of diametrical-plate flanges, and means for drawing said clamping bars together to force the respective packing strip to effect a fluid-tight seal along the juncture of said diametrical plates and said housing partition.

JOE C. SHAW.

REFERENCES CITED

The following references are of record in the file of this patent:

UNITED STATES PATENTS

| Number | Name | Date |
|---|---|---|
| 1,454,053 | Jones | May 8, 1923 |
| 1,994,779 | McNeal | Mar. 19, 1935 |